Oct. 1, 1963 K. S. ROUNDS ET AL 3,105,436
CHECK PROTECTORS
Filed Oct. 30, 1961 4 Sheets-Sheet 4
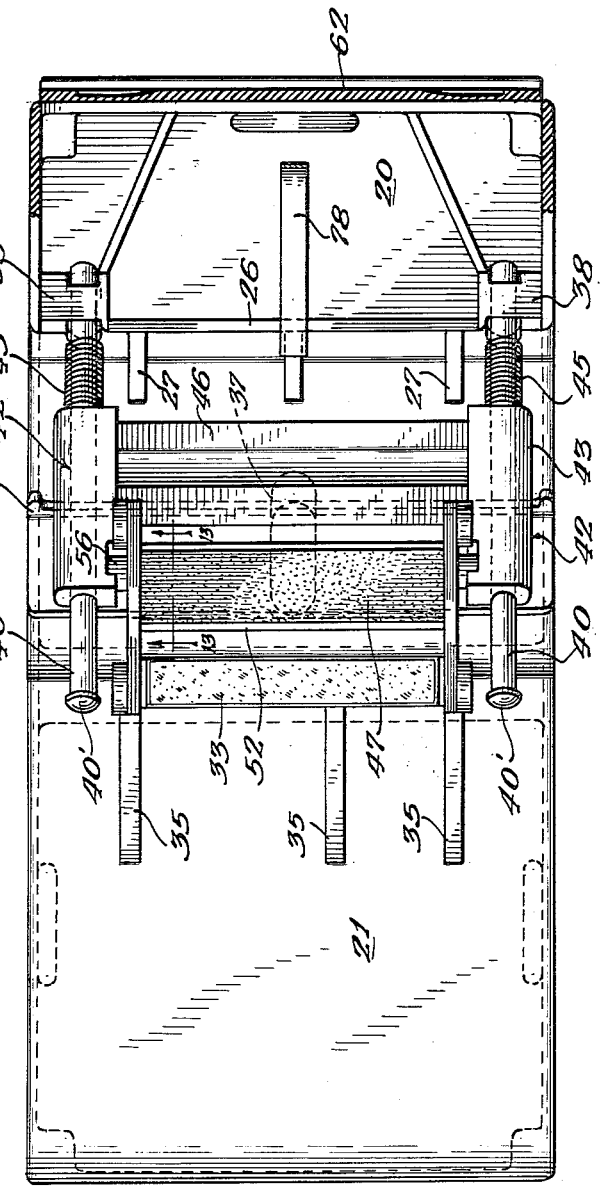
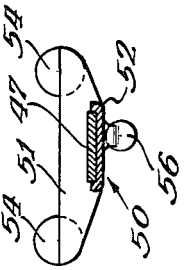
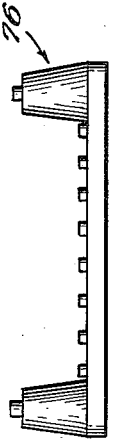
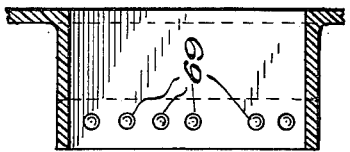
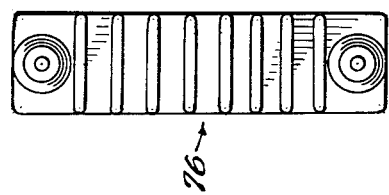

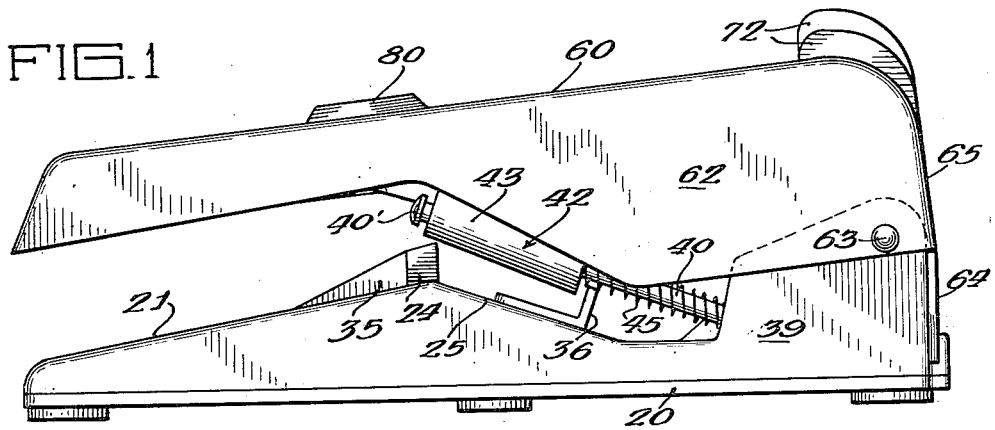
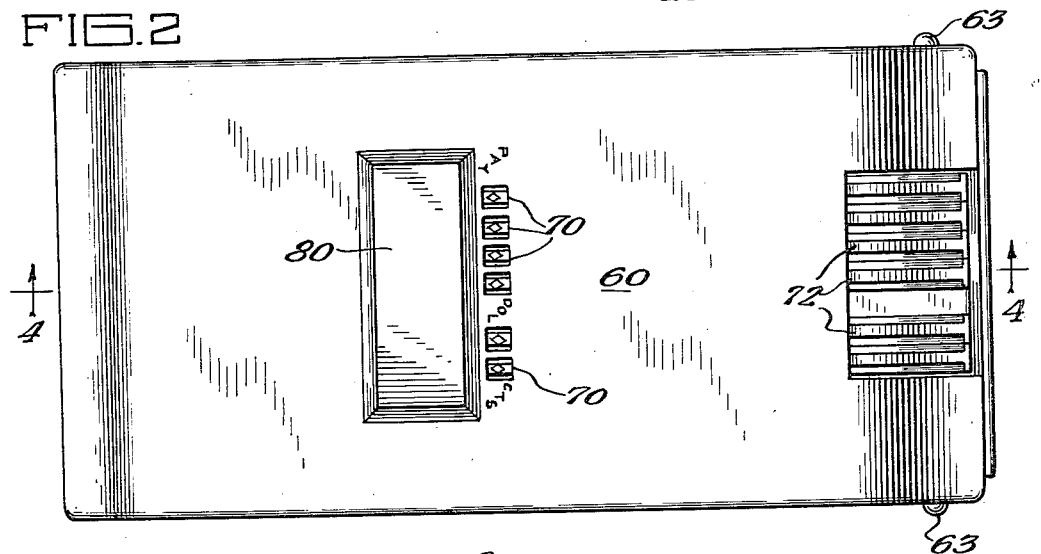
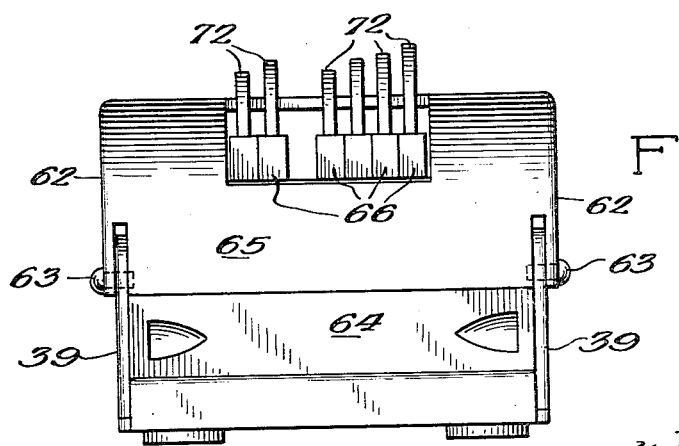

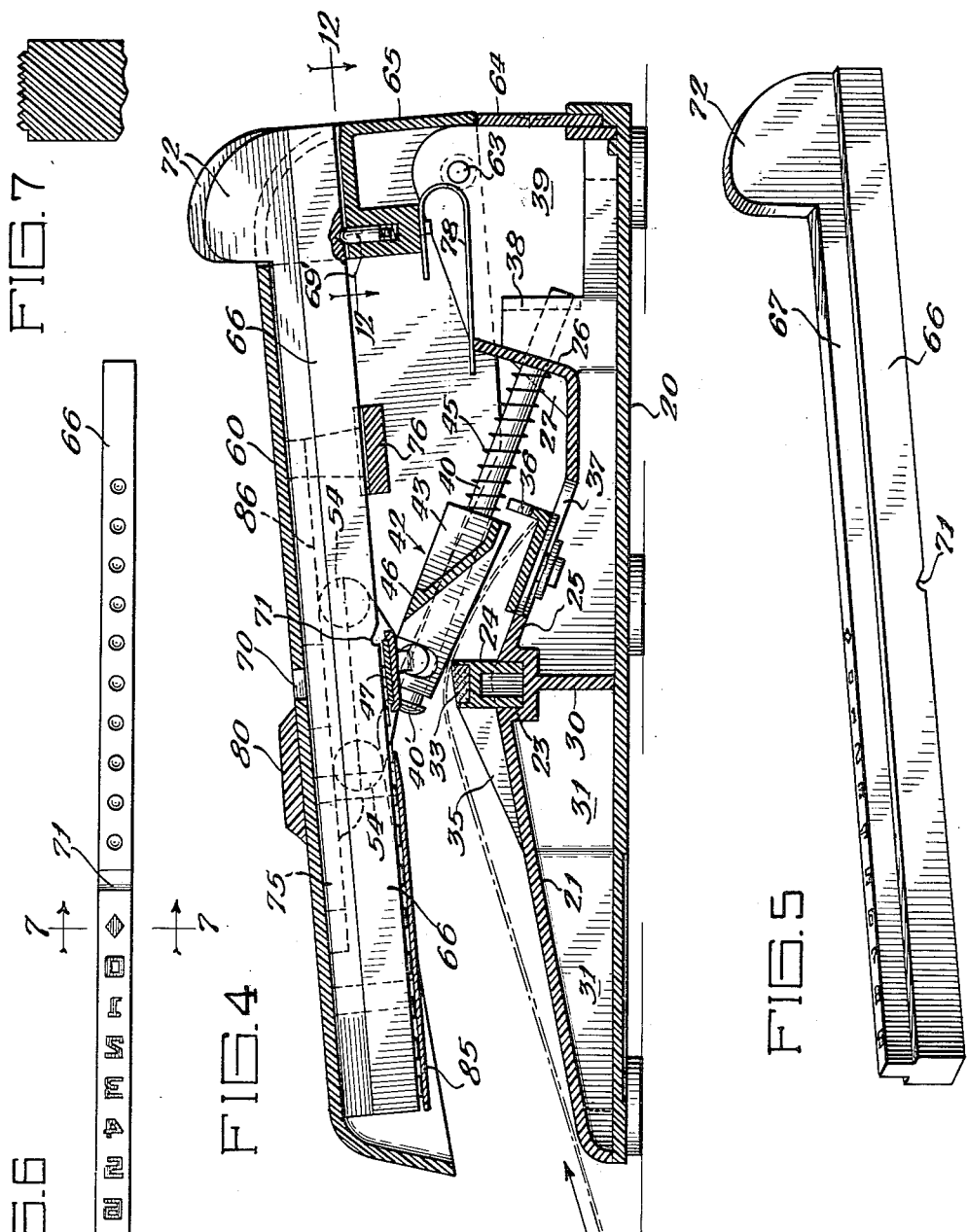

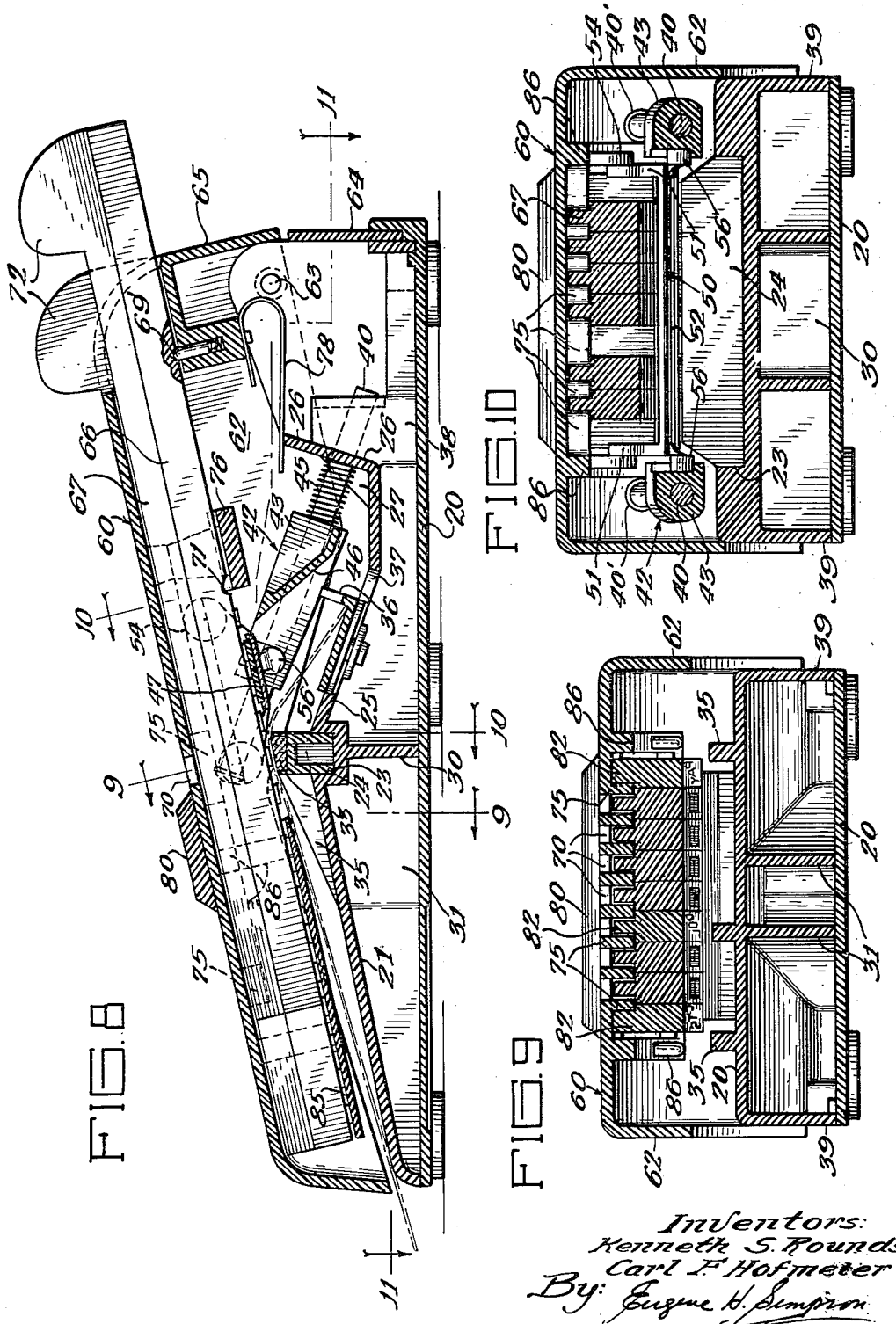

3,105,436
CHECK PROTECTORS
Kenneth S. Rounds, Wauwatosa, and Carl F. Hofmeier, Grafton, Wis.; said Rounds assignor to said Hofmeier
Filed Oct. 30, 1961, Ser. No. 148,412
4 Claims. (Cl. 101—20)

This invention relates to check protectors and more particularly to a check protector for home use.

Check protectors made heretofore are expensive and their general use therefore has been limited to business establishments.

It is an object of this invention to provide a check protector which can be sold at a price which would make it acceptable to an individual.

Another object is to provide a check protector or check writer that will impregnate the check with the ink used in the printing of the value of the check.

A further object of the invention is to print the amount of the check in dollars and cents in which the ink will impregnate the paper and still leave the paper smooth.

A still further object is to provide a check protector which will be economical to manufacture.

A still further object is to provide a check protector which will be both light in weight and rugged in construction.

Still further objects will become apparent upon considering the following specification, which when considered in conjunction with the accompanying drawings illustrates a preferred form of the invention.

In the drawings:

FIG. 1 is a side elevational view of a check protector embodying the present invention;

FIG. 2 is a top plan view of the check protector shown in FIG. 1;

FIG. 3 is a rear elevational view of the check protector shown in FIGS. 1 and 2;

FIG. 4 is a cross-sectional view taken on the line 4—4 of FIG. 2, and shows the check protector in open, or non-printing, position;

FIG. 5 is a perspective view of the type bar used in the check protector;

FIG. 6 is a bottom plane view of the printing bar showing the type faces;

FIG. 7 is an enlarged transverse cross-section taken on the line 7—7 of FIG. 6 through the type bar and shows the serrations on the type faces;

FIG. 8 is a view similar to FIG. 4 but shows the check protector in printing position with the type face in engagement with the cork top of the cushion bar;

FIG. 9 is a transverse cross-section taken on the line 9—9 of FIG. 8, looking in the direction of the arrows;

FIG. 10 is a transverse cross-section taken on the line 10—10 of FIG. 8, looking in the direction of the arrows;

FIG. 11 is a horizontal cross-section of the check protector taken on the line 11—11 of FIG. 8, looking in the direction of the arrows;

FIG. 12 is a horizontal cross-section of the check protector taken on the line 12—12 of FIG. 4, looking in the direction of the arrows;

FIG. 13 is a transverse cross-section through the ink pad taken on the line 13—13 of FIG. 11, looking in the direction of the arrows, and showing the construction of the pivoted inking pad holder;

FIG. 14 is a plan view of the guide-support for the type bars, per se;

FIG. 15 is an elevational view of the guide-support for the type bars as seen in FIG. 14; and FIG. 16 is a cross-sectional view of a modified form of the invention showing a serrated backing plate for the type face.

Referring to the drawings, and particularly to FIGS. 4, 8, 9 and 10, the check protector is supported from a lower rectangular base 20. A top 21 for the base 20 tapers upwardly from the front of the base 20 to approximately the center, the taper terminating in a rectangular recess 23 which accommodates a cushion bar 24.

The rear portion 25 of the top 21 of the base tapers downwardly and to the rear and terminates in a vertical bumper wall 26 supported by gusset plates 27.

Both front and rear tapered portions of the top 21—25 are supported from the base 20 by a transverse supporting wall 30 and a pair of supporting walls 31 extending generally longitudinally and crossing each other intermediate their ends.

The cushion bar 24, which must be made of rigid material to insure clear printing, is secured in the recess 23, by friction, and has a cork top 33 which permits the type face to break the upper surface of the check and permit the ink to penetrate into the body thereof without marring the lower surface of the paper.

A plurality of gusset plates 35 is formed on the upper surface of the top 21 and serves the dual purpose of bracing the cushion bar 24 and of guiding the check entering the protector so that it assumes the correct position for printing.

The rear surface 25 of the top of the base receives an adjustable check stop 36 which is slidably mounted on the downwardly sloping surface 25 in a slot 37 so that when a check is inserted it is held in the correct position to print the required amount in the space provided thereon.

A pair of posts 38—38 is formed on the side walls 39 behind the bumper wall 26, the posts being provided with apertures to receive a pair of parallel rods 40—40. The rods 40—40 slope upwardly from the rear of the base toward the front and form an inclined plane upon which the parallel members of a substantially H-shaped frame 42 are slidably mounted.

The H-shaped frame 42, or carriage, is composed of a pair of parallel support members 43 having longitudinal apertures therethrough which receive the rods 40 and slide thereon. A cross piece 46 is intrically formed between the members 43 to provide a unitary structure for the frame 42.

The frame 42 is urged upward and forward on the rods 40 by a pair of coil compression springs 45—45 which are mounted on the rods 40 between the frame 42 and the bumper wall 26. A knob 40' limits the forward movement of the frame 42 on the rods 40. The cross piece 46 has a lower surface which in its forward position extends to the rear lower edge of the ink pad 47 and assists in guiding checks to the proper position for stamping.

A cradle 50 (FIG. 13) is formed with a pair of end pieces 51—51 which are formed integrally with a horizontal bed 52. The bed 52 contains an upwardly facing cavity to retain the ink pad 47. Each end 51 of the cradle is provided with a pair of knobs 54—54 for the purpose to be set forth below.

The cradle 50 is carried by pivots 56—56 which are carried in sockets in the forward end of the H-shaped frame 42. The sockets and the pivots 56—56 permit the cradle to rock about the pivots.

An actuating member 60 is positioned above the base member, the actuating member having downwardly extending side pieces 62 which overlie the side walls 39 formed on the base 20 with alined pivot pins 63—63 connecting the side pieces 62 with the side walls 39 adjacent the rear of the check protector. The upward movement of the actuating member 60 is limited by a limit plate 64 which engages in a slot in the rear of the base 20 and is engaged by a rear downwardly extending end piece 65 on the rear of the actuating member 60.

A plurality of type bars 66 containing the numerals 0 to 9 in type on the lower or printing face 66 (FIG. 7) and corresponding numerals 0 to 9 on the indicating face 67 (FIG. 5) directly opposite the type face 0 to 9 are mounted in the actuating member in a manner to be described below. The type face is serrated as shown in FIG. 7.

A single type bar 66, as shown in FIGS. 5, 6 and 7, has a plurality of recesses 69 therein which are engaged by a spring actuated plunger 69' to stop the type bar in the proper position to print the number desired. In such position the numeral to be printed will show through an aperture 70 in the actuating member 60. A stop member 71 in the form of a notch is engaged by the spring actuated plunger 69' to prevent withdrawal of the type bar from the check protector. A handle 72 is formed on the outer end of each type bar and projects through the rear end of the actuating member 60 to permit ready manipulation of the type bars 66.

Referring now particularly to FIGS. 9 and 10, the type bars 66 are mounted between guides 75 formed in the under top surface of the actuating member 60 and are held therein by a bridge 76, shown in detail in FIG. 15.

A spring 78 is mounted on a portion of the actuating member 60 below the spring pressed plunger 69' and contacts the wall 26 to retain the actuating member normally open with respect to the check protector.

A reinforcing plate 80 lends rigidity to the actuating member and insures uniform printing by the type bars.

Fixed type faces 82 contain the words "PAY," "DOL" and "CTS."

A plate 85 covers the type bars 66 adjacent to and forward of the cushion bar 24 to prevent soiling of the check during insertion in the check protector.

Operation

In operation the type bars are adjusted by means of the handles 72 so that the proper amount of the check is indicated in the opening 70 through the top of the actuating member 60. In this position the type face as presented for printing will be the same as the amount indicated on the numerals showing through the aperture 70. The check may then be inserted through the front of the protector and passed over the cushion member 33 and guided to the stop member 36 which has been adjusted previously for the size of the check.

In the position shown in FIG. 4 in which the actuating member is in its uppermost position, the ink pad 47 contacts the type faces and provides ink therefor. To imprint the check, pressure is applied to the reinforcing plate 80 causing the actuating member 60 to rotate about the pivot 63 against the action of the spring 78.

Movement downward of the actuating member 60 applies a perpendicular force from tracks 86 formed in the underside of the actuating member 60 to the knobs 54—54 causing a component of that force along the inclined plane 40—40 to move the frame 42 rearwardly and downwardly withdrawing the ink pad from the type face and moving the entire frame 42 rearwardly out of engagement with the type face, permitting the type to contact the check and to print the required amount thereon.

If desired, the cork cushion member 33 may be replaced by a rigid serrated member as seen in FIG. 16, with serrations corresponding to the serrations on the type face shown on FIG. 6.

Having thus described the invention, it will be realized that it is intended to show merely a preferred embodiment thereof and that various changes in size, shape and arrangement of parts may be resorted to without departing from the spirit of the invention or the scope of the subjoined claims.

That which is claimed as new and is desired to be secured by United States Letters Patent is:

1. A check writer of the character described comprising: a base, an actuating member pivotally connected to said base, a plurality of elongated horizontally disposed type bars carried by said actuating member, a setting means integral with each type bar to position the type bar in the actuating member, means to prevent withdrawal of the type bar from the actuating member, a cushion member mounted in said base and adapted to support a check, means adjustably secured to the base to position the check for printing, means defining an inclined plane supported from said base, a carriage supported by the last named means for limited movement thereon, resilient means constantly urging said carriage on its support towards one limit of its movement, a cradle pivotally mounted on said carriage, an ink pad mounted in said cradle in contact with the type to be printed, a plurality of knobs formed on the upper side of said cradle on opposite sides of said pivot, and tracks formed in said actuating member to move the ink pad out of engagement with the type to be printed from the bars, against the action of the resilient means as the type bars move into engagement with the check.

2. A check writer as defined in claim 1 including a reinforcing member on said actuating member adjacent the type to be printed.

3. A check writer as defined in claim 1 in which the setting means are varied in size to indicate the position of the numeral to be printed.

4. A check writer as defined in claim 1 including means to limit the upward movement of the actuating member.

References Cited in the file of this patent

UNITED STATES PATENTS

| | | |
|---|---|---|
| 1,372,323 | Tiefel | Mar. 22, 1921 |
| 1,703,106 | Hedman | Feb. 26, 1929 |
| 1,796,187 | Bohrer | Mar. 10, 1931 |
| 1,943,607 | Hedman | Jan. 16, 1934 |